United States Patent [19]

Berthelot et al.

[11] 4,338,154

[45] Jul. 6, 1982

[54] MACHINE FOR PRODUCING SINGLE-FACE CORRUGATED BOARD

[75] Inventors: Daniel Berthelot, Montluel; Gerard Badin, Bourgoin-Jallieu, both of France

[73] Assignee: S. A. Martin, Villeurbanne, France

[21] Appl. No.: 186,006

[22] Filed: Sep. 10, 1980

[30] Foreign Application Priority Data

Sep. 14, 1979 [FR] France ............................... 79 22960
Jun. 18, 1980 [FR] France ............................... 80 13545

[51] Int. Cl.[3] ........................... B29D 7/14; B31F 1/00

[52] U.S. Cl. ................................... 156/462; 156/189; 156/190; 156/191; 156/205; 156/206; 156/210; 156/285; 156/470; 156/472; 156/473; 425/369; 425/388; 425/396

[58] Field of Search ............... 156/189, 190, 191, 205, 156/206, 210, 285, 462, 470, 472, 473; 425/369, 388, 383, 363, 396

[56] References Cited

U.S. PATENT DOCUMENTS 3,854,861 12/1974 Worrall ............................... 156/205
3,947,206 3/1976 DeLigt ............................... 425/388
3,972,763 8/1976 Wolvin ............................... 156/210
4,059,474 11/1977 Coburn ............................... 156/462
4,251,313 2/1981 Able ............................... 156/462

*Primary Examiner*—Marion McCamish
*Attorney, Agent, or Firm*—Pollock, Vande Sande & Priddy

[57] ABSTRACT

In a single-face corrugator of the type in which the corrugated paper is held by suction against the lower corrugated cylinder, the latter includes, outside its inner chamber filled with saturated heating vapor, separate longitudinal channels in the peripheral body of the cylinder. Each channel is connected to the exterior via axial channels and elongate grooves machined in the periphery of the cylinder, and can be connected to a suction apparatus via two hollow and sealed circular arcuate sectors bearing on the part of the face of the cylinder associated with the holding region on the latter. The grooves are staggered and machined in circumferential portions of the periphery of the cylinder so as to extend over several corrugations thereof. An additional blowing sector permits detachment of the corrugated paper.

12 Claims, 7 Drawing Figures

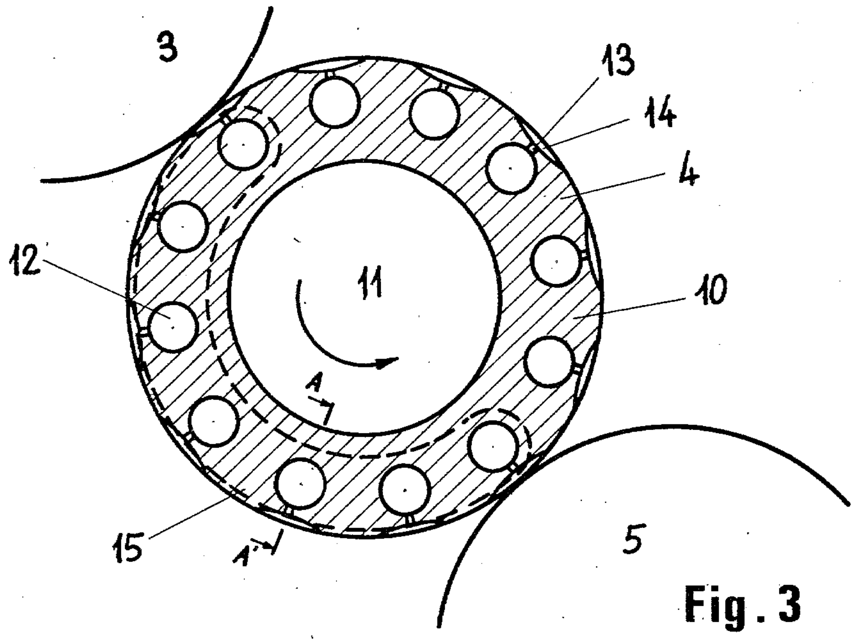
Fig. 3
Fig. 4
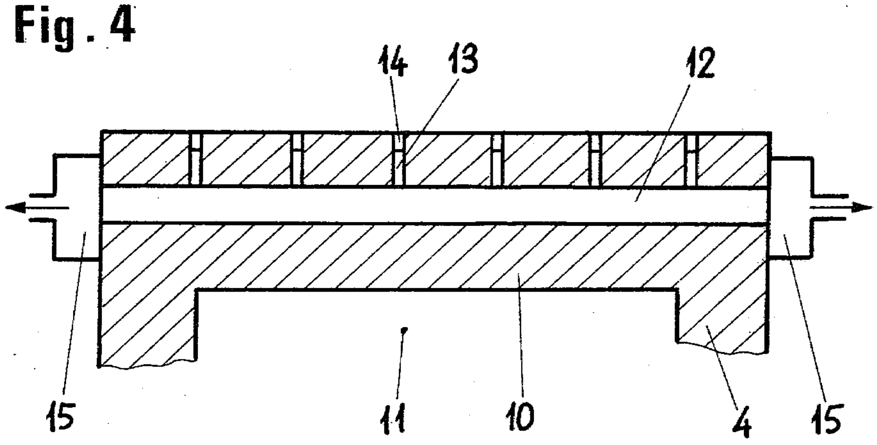
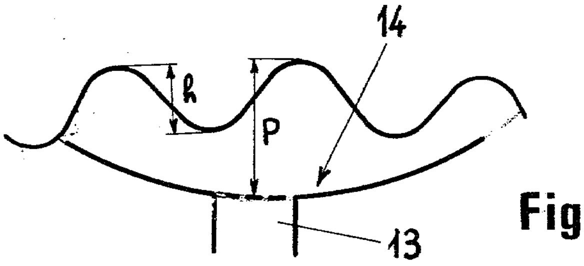
Fig. 5

MACHINE FOR PRODUCING SINGLE-FACE CORRUGATED BOARD

BACKGROUND OF THE INVENTION

The present invention concerns a machine for producing corrugated board lined on a single face, commonly called "single-face corrugator", and more precisely concerns an apparatus for holding the sheet of paper on the second corrugating roller, termed "lower corrugated cylinder", used on this type of machine.

Corrugating of paper is usually achieved in a single-face corrugator by thermo-forming between two corrugated cylinders heated through their hollow inner space with saturated vapor, and applied by meshing by two actuators. To prevent separation of the corrugated sheet from the second corrugating roller, termed lower corrugated cylinder, it is necessary to provide an apparatus for holding the sheet on this latter cylinder. Prior art holding apparatuses are mechanical in nature and are generally constituted by a set of guiding fingers, or "combs", in contact with the moving corrugated sheet. Such holding apparatuses present a certain number of disadvantages:

mounting and de-mounting of the combs is long and difficult, because of the presence of the combs, it is not possible to put adhesive opposite each of these, since the paper permanently rubs against the combs, wear is rapid and maintenance costs are high, to detach the corrugated paper from the upper corrugated cylinder, the combs have to be engaged in the latter, which makes machine grooves necessary.

Instead of using mechanical holding means, use of pneumatic holding means, either by pressure or by suction, has been considered for some time. However, such means have not been entirely satisfactory, on the one hand because the means for holding by pressure have the disadvantage of blowing away a considerable part of the adhesive laid on the corrugated paper, and on the other hand because the various suction means proposed hitherto either give insufficient suction unless considerable energy is involved, or do not allow heating with saturated vapor of the lower corrugated cylinder to be maintained.

SUMMARY OF THE INVENTION

The single-face corrugator according to the present invention does not present the disadvantages of prior art apparatuses for holding the sheet of paper on the lower corrugated cylinder. It is of the type in which the lower corrugated cylinder has a hollow inner space for receiving saturated vapor, and in which holding of the corrugated paper on the said lower corrugated cylinder is achieved by suction of the paper onto the latter, the said suction being effected through channels or orifices opening into larger cavities machined in the exterior of the said lower corrugated cylinder.

The invention also concerns a corrugated cylinder for a single-face corrugator intended to be used as the lower corrugated suction cylinder in a corrugator as defined above.

BRIEF DESCRIPTION OF THE DRAWINGS

The invention will be better understood from the following description of some embodiments, with reference to the attached drawings in which:

FIG. 3 is a sectional side view of the lower corrugated cylinder equipping the corrugator of FIG. 1;

FIG. 4 is a section view along line A—A' of FIG. 3;

FIG. 5 is an enlarged view of a detail from FIG. 3;

DETAILED DESCRIPTION OF AN EMBODIMENT

Figure 1:
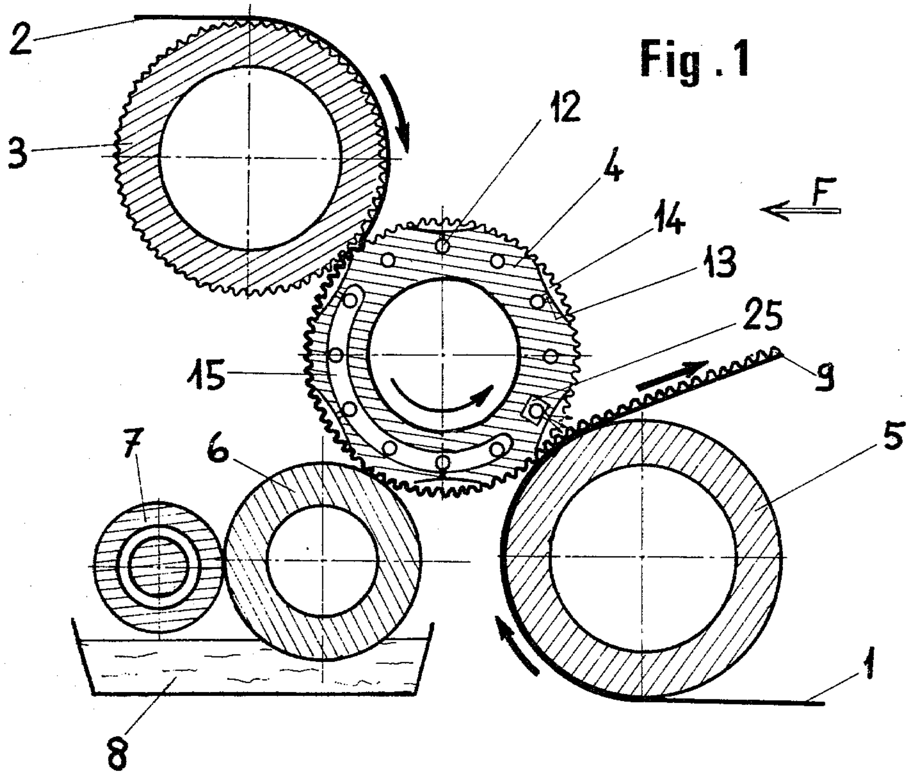
FIG. 1 is a diagrammatic side view of a single-face corrugator according to the invention.

With reference to FIGS. 1 to 5, the paper 2 is corrugated, in a manner known per se, by passage between two corrugated cylinders 3 and 4 positioned one above the other, and then glued on a cover paper 1 between the lower corrugated cylinder 4 and a smooth cylinder 5, to finally leave the machine in the form of a strip 9 of single-face corrugated board. The cylinders 3 and 4 are heated by vapor at a temperature of about 200° C. and under a pressure of about 16 bars admitted, by a conventional apparatus (not shown), to the hollow interior of the cylinders, which allows the paper to reach the optimal temperature for thermo-forming of the corrugation. The corrugated paper receives adhesive via a cylinder 6 which dips into a container 8 of adhesive. The thickness of the adhesive laid on the paper is regulated by the space between the cylinder 6 and an auxiliary cylinder 7.

Figure 2:
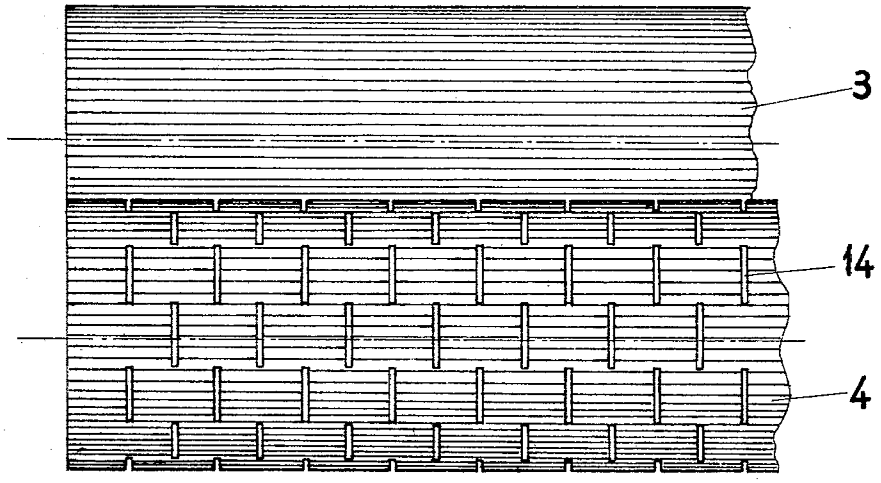
FIG. 2 is a perspective view of the upper and lower corrugated cylinders in the direction F of FIG. 1.

As shown in the drawings, the lower corrugated cylinder 4 is machined, in a conventional way, in the form of a sleeve 10 allowing vapor to be admitted into its inner space 11. In addition, a large number of longitudinal channels 12 are provided in the body of the sleeve 10 in such a manner as to be regularly distributed over the whole width of the cylinder. Axial holes 13 of small diameter are additionally pierced about every 8 cm along each channel 12 and, in accordance with the invention, put each of the latter in communication with the larger cavities 14 machined in the exterior of the corrugated cylinder 4. The cavities 14 are in the form of elongate grooves machined in the circumferential portions of the periphery of the cylinder 4, arranged so as to be staggered on the said periphery as shown in FIG. 2, and extending over several corrugations of the said cylinder. As can be seen particularly in FIG. 5, the cavities 14 also have a section in the shape of a circular arc and, extending over several corrugations of the cylinder, have a depth P greater than that h of the profile of the corrugation.

At each end of the cylinder 4, and on the face of this, a fixed sector 15 is installed, which is sealed, hollow and circularly arcuate, and which bears on the part of the face of the cylinder 4 which corresponds to the region holding the paper on the cylinder 4 during its journey between the cylinders 3 and 5. Each hollow sector 15 is connected to a permanently operating vacuum pump (not shown). In addition, a further hollow sealed sector 25 is positioned immediately after each sectors 15, on each face of the cylinder 4. The sectors 25 are sufficiently wide to be able to include at least one of the channels 12 and are supplied by a source of compressed air (not shown).

The operation of the apparatus for holding the corrugated paper on the cylinder 4 is as follows: When the cylinder 4 turns, each channel 12 passes alternately into the sectors 15 and then into free air. Passage in front of the sectors 15 allows the low pressure due to the vacuum pump to be transmitted into the cavities 14 which correspond to the channels 12 in the said sectors. The paper is therefore held by suction against the cylinder 4 over the entire holding region included by the sectors 15. Then, as shown in FIG. 1, each channel 12, when it leaves the sectors 15, is returned to free air and then enters the sectors 25; blowing is then produced by the cavities 14, which facilitates detaching of the sheet of corrugated paper from the cylinder 4.

Figure 6:
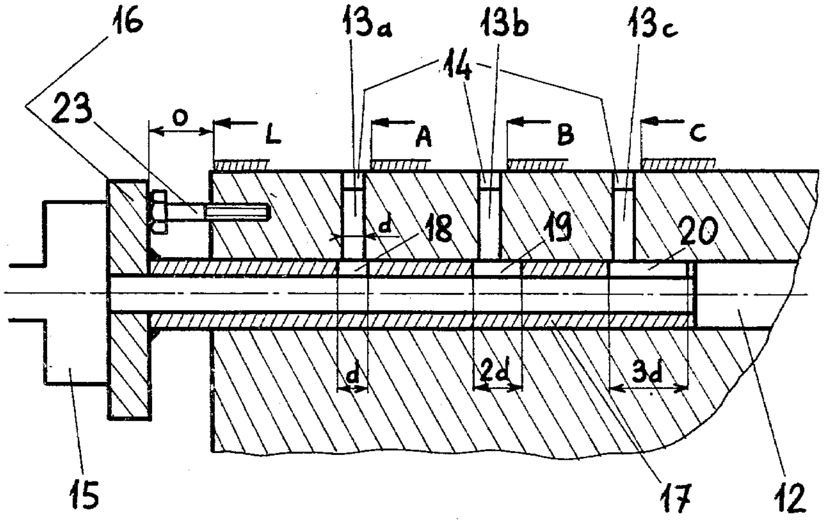
FIG. 6 represents diagrammatically a variant of the preceding corrugator allowing work with gauges of various widths.

In FIG. 6, a variant of the apparatus which permits widths of corrugated paper of different cuts to be worked with, is shown schematically. According to this variant, two annular plates 16, on which tubes 17 slidable in the ends of each channel 12 are welded, are made solid with the corrugated cylinder 4 and therefore turn with it. The extent to which the tubes 17 are inserted into the channels 12 is regulated by two screws 23 screwing longitudinally into the body of the corrugated cylinder 4.

In the upper part of the tubes 17 several holes (18, 19, 20) are provided, spaced so that their edges located towards the face of the cylinder 4 are separated by the space separating two holes 13 and so that their diameter is equal, in the case of the first hole 18 to the diameter d of a hole 13, then **2*d* for the second hole 19 and 3*d* for the third and last hole 20**.

In the position 0 represented in the drawing, each of the three holes 18, 19, 20 is opposite one of the orifices 13, so that the vacuum is transmitted to the corresponding cavities 14, which allows operation at full width L as represented in the drawing.

When operation with a narrower width A is required, each cylinder 17 is withdrawn by an amount d, by outward rotation of each screw 29, so that each first orifice such as **13*a* is closed off while all the succeeding orifices such as 13*b* and 13*c*** are still connected to the vacuum pump.

Similarly, for an even narrower width B, an outward sliding **2*d* is effected. The first hole 18 is no longer in correspondence with its orifices 13*a* and the second hole 19 is also no longer in correspondence with its orifice 13*b***, so that suction is well applied over the width B and not outside.

For an even narrower width C, a displacement **3*d* is similarly caused so as to close off the third orifice 13*c*, and so forth with longer tubes 17**.

Thanks to this additional apparatus, suction is not applied except at the region actually covered by the corrugated paper even for widths smaller than the full width.

Figure 7:
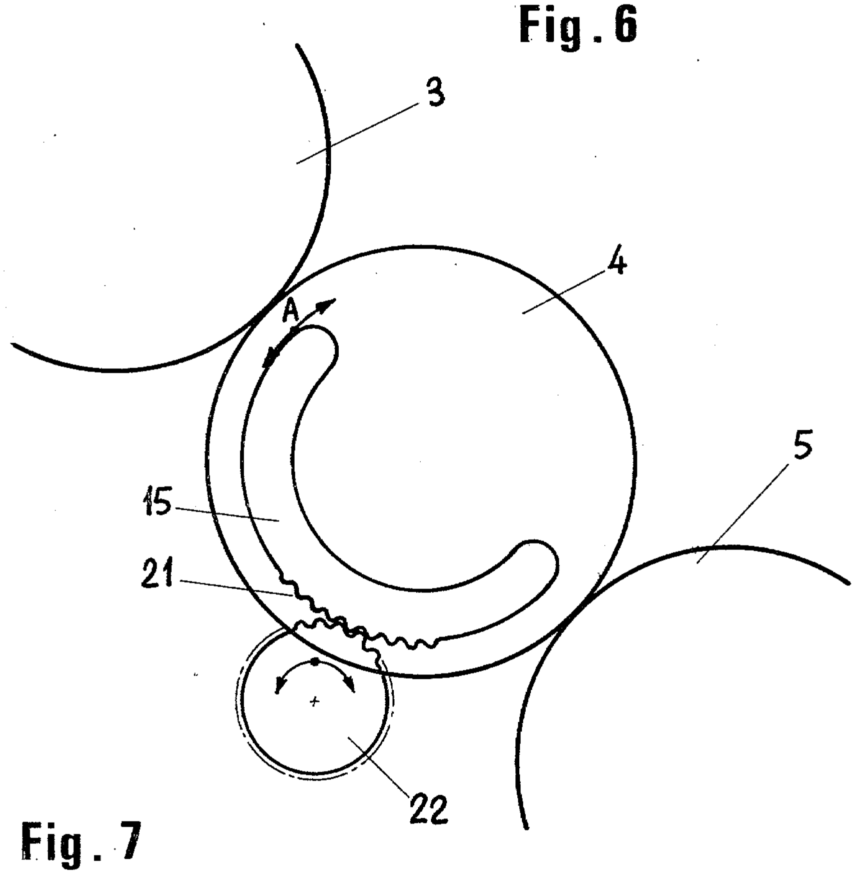
FIG. 7 represents diagrammatically a variant of the corrugators according to FIGS. 1 to 6.

FIG. 7 represents diagrammatically a variant of the two previous apparatuses, for the case when the point A, at which the suction begins to hold the paper against the surface of the cylinder 4, has to be displaced in dependence upon the speed and the quality of the paper. A gearing 21 is then cut in each of the sectors 15, and this gearing engages with a pinion 22 mounted on the shaft of a motor not represented. By making the motor turn in one direction or the other, the pinion 22 makes the sector 15 turn in a corresponding way by means of the gearing 21. By means of a tachometer, mounted on the motor for driving the single-face corrugator and connected to the motor for driving the two pinions 22, the position of the two sectors 15 can then be easily slaved as a function of the speed of the corrugator.

We claim:

1. Single-face corrugator for forming corrugated paper, comprising (a) an upper corrugated cylinder (3);

(b) a lower corrugated cylinder (4) adapted to mesh with said upper corrugated cylinder;

(c) said lower corrugated cylinder having a hollow inner space (11) for receiving saturated heating vapor;

(d) means for applying suction for holding said paper against said lower corrugated cylinder, said suction means comprising orifices (13) opening into larger cavities (14) provided in the exterior of said lower corrugated cylinder (4).

2. Single-face corrugator according to claim 1, wherein said cavities (14) extend over several corrugations of said lower corrugated cylinder.

3. Single-face corrugator according to claim 2, wherein said cavities (14) have a depth (P) greater than that (h) of the profile of the corrugation.

4. Single-face corrugator according to claim 1, wherein said cavities comprise elongate grooves provided in circumferential portions of the periphery of said lower corrugated cylinder.

5. Single-face corrugator according to claim 1, wherein said cavities (14) are staggered on said lower corrugated cylinder (FIG. 2).

6. Single-face corrugator according to claim 1, comprising means for blowing through said cavities (14) at the point where said paper leaves said lower corrugated cylinder, for detaching said paper from said cylinder.

7. Single-face corrugator according to claim 6, wherein said blowing means comprises at least one hollow and sealed sector (25) positioned on the face of the said lower corrugated cylinder immediately downstream of said suction means (15).

8. Single-face corrugator according to claim 1, comprising means for selectively blocking said orifices.

9. Single-face corrugator according to claim 1, wherein said orifices are connected to at least one suction means via at least one hollow and sealed circular arcuate sector (15) bearing on the part of the face of said cylinder associated with the region for holding the paper on the latter, and comprising means (21, 22) for varying the position of said at least one sector.

10. Single-face corrugator according to claim 9, wherein said apparatus (21, 22) is controlled by an apparatus slaved to the speed of said corrugator.

11. Corrugated cylinder for a single-face corrugator, said cylinder having a hollow inner space (11) for receiving saturated heating vapor, and comprising, outside said hollow inner space (11), separate longitudinal channels (12) arranged in the peripheral part (10) of the body of said cylinder, radial orifices (13) connecting said longitudinal channels to the exterior, said radial orifices (13) opening into larger cavities (14) provided in circumferential portions of the periphery of said cylinder so as to extend over several corrugations of the latter.

12. Corrugated cylinder for a single-face corrugator according to claim 11, wherein said cavities are staggered on said lower corrugated cylinder.

* * * * *